(12) United States Patent
Fiumano et al.

(10) Patent No.: US 9,860,791 B1
(45) Date of Patent: Jan. 2, 2018

(54) LONG TERM EVOLUTION COMMUNICATION POLICIES BASED ON EXPLICIT CONGESTION NOTIFICATION

(71) Applicant: Sprint Communications Company L.P., Overland Park, KS (US)

(72) Inventors: Michael Francis Fiumano, McLean, VA (US); Luis D. Glass, Kirkland, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 73 days.

(21) Appl. No.: 14/321,971

(22) Filed: Jul. 2, 2014

(51) Int. Cl.
- H04W 28/12 (2009.01)
- H04W 28/02 (2009.01)

(52) U.S. Cl.
CPC ........ *H04W 28/12* (2013.01); *H04W 28/0284* (2013.01); *H04W 28/0289* (2013.01)

(58) Field of Classification Search
None
See application file for complete search history.

(56) References Cited

U.S. PATENT DOCUMENTS

| | | |
|---|---|---|
| 6,741,555 B1 | 5/2004 | Li et al. |
| 7,760,646 B2 | 7/2010 | Kekki |
| 2008/0144496 A1* | 6/2008 | Bachmutsky ........... H04L 47/31 370/230.1 |
| 2008/0268864 A1* | 10/2008 | Andersson .......... H04L 12/5695 455/453 |
| 2010/0195521 A1* | 8/2010 | Wanstedt ................ H04L 47/10 370/252 |
| 2011/0075563 A1* | 3/2011 | Leung ..................... H04L 12/66 370/236 |
| 2011/0170410 A1* | 7/2011 | Zhao ....................... H04L 47/10 370/232 |
| 2011/0222406 A1* | 9/2011 | Persson ................... H04L 47/12 370/236 |

(Continued)

FOREIGN PATENT DOCUMENTS

JP   WO 2013034663 A1 * 3/2013 ........... H04L 47/125

OTHER PUBLICATIONS

"Difference Between PCRF and ECRF", DifferenceBetween.com, Jul. 1, 2012.*

*Primary Examiner* — Chi H Pham
*Assistant Examiner* — Vladislav Agureyev (57) ABSTRACT

Examples disclosed herein provide systems, methods, and software to control wireless communication policies and rules based on congestion. In one example, a method of operating a Long Term Evolution (LTE) network includes, in a LTE base station, identifying congestion data for one or more communicating wireless communication devices, and identifying that the congestion data meets a congestion criteria. The method further includes, in the LTE base station and responsive to meeting the congestion criteria, setting an explicit congestion notification (ECN) flag for a wireless communication device communication, and transferring the ECN flag for delivery to a LTE gateway. The method further provides, in the LTE gateway, receiving the ECN flag, and identifying a congestion policy for at least one wireless communication device communicating with the LTE base station.

20 Claims, 9 Drawing Sheets

(56) References Cited

U.S. PATENT DOCUMENTS

| | | | | |
|---|---|---|---|---|
| 2011/0261695 A1* | 10/2011 | Zhao | ............ | H04W 28/10 |
| | | | | 370/232 |
| 2012/0051216 A1* | 3/2012 | Zhang | ............ | H04L 47/12 |
| | | | | 370/230 |
| 2012/0087245 A1* | 4/2012 | Leung | ............ | H04L 47/12 |
| | | | | 370/236 |
| 2012/0092995 A1* | 4/2012 | Arvidsson | ............ | H04L 47/10 |
| | | | | 370/235 |
| 2012/0182859 A1* | 7/2012 | Ikeda | ............ | H04L 1/1835 |
| | | | | 370/216 |
| 2012/0201137 A1* | 8/2012 | Le Faucheur | ............ | H04L 47/11 |
| | | | | 370/235 |
| 2012/0218899 A1* | 8/2012 | Ozawa | ............ | H04M 7/0072 |
| | | | | 370/237 |
| 2012/0257505 A1* | 10/2012 | Kutscher | ............ | H04L 47/20 |
| | | | | 370/235 |
| 2013/0044694 A1* | 2/2013 | Aguirre | ............ | H04W 28/16 |
| | | | | 370/329 |
| 2013/0301559 A1* | 11/2013 | Zakrzewski | ............ | H04W 28/0215 |
| | | | | 370/329 |
| 2014/0064072 A1* | 3/2014 | Ludwig | ............ | H04L 47/2483 |
| | | | | 370/230 |
| 2014/0133296 A1* | 5/2014 | Johansson | ............ | H04W 72/1252 |
| | | | | 370/230 |
| 2014/0233390 A1* | 8/2014 | Schmid | ............ | H04L 47/125 |
| | | | | 370/236 |
| 2014/0321378 A1* | 10/2014 | Zhang | ............ | H04L 67/322 |
| | | | | 370/329 |

* cited by examiner

LONG TERM EVOLUTION COMMUNICATION POLICIES BASED ON EXPLICIT CONGESTION NOTIFICATION

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services. In some examples, the wireless access nodes may experience congestion as more users and bandwidth are required for a particular region. However, when the congestion occurs, it is often difficult to quickly respond with policies that alleviate some of the congestion issues.

In at least one form of communication between two endpoint systems, transmission control protocol (TCP)/Internet Protocol (IP), together TCP/IP, may be used for the communication. TCP/IP is the suite of communication protocols to connect two end point devices on the internet. In some implementations of TCP/IP, explicit congestion notification (ECN) may be used as an extension to the suite to allow end-to-end notification of network congestion without dropping packets. ECN is an optional feature that is only used when both of the end points in the communication support the notification and are willing to use the notification. Thus, in some examples, the bits that are reserved for ECN flags may go unused.

Overview

Examples disclosed herein provide systems, methods, and software to communication policies based on congestion. In one example, a method of operating a Long Term Evolution (LTE) network includes, in a LTE base station, identifying congestion data for one or more communication wireless communication devices, and identifying that the congestion data meets a congestion criteria. The method further includes, in the LTE base station and responsive to meeting the congestion criteria, setting an explicit congestion notification (ECN) flag for a wireless communication device communication, and transferring the ECN flag for delivery to a LTE gateway. The method further provides, in the LTE gateway, receiving the ECN flag, and identifying a congestion policy for the at least one wireless communication device communicating over the LTE base station.

DETAILED DESCRIPTION

Figure 1:
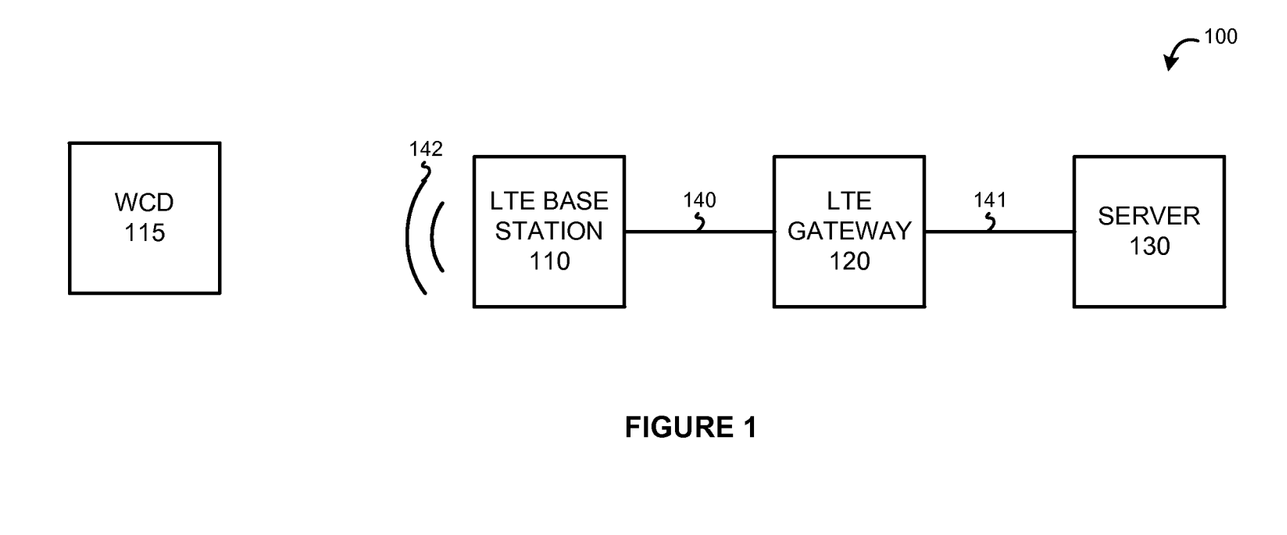
FIG. 1 illustrates a communication system to control Long Term Evolution communication policies based on congestion.

FIG. 1 illustrates a communication system 100 to control Long Term Evolution (LTE) communication policies based on congestion. Communication system 100 includes LTE base station 110, wireless communication device (WCD) 115, LTE gateway 120, and data server 130. LTE base station 110, which may comprise an eNodeB in some examples, communicates with LTE gateway 120 over communication link 140, and LTE gateway 120 further communicates with data server 130 over communication link 141. LTE base station 110 communicates with WCD 115 over wireless sector 142. WCD 115 comprises a phone, computer, media player, internet appliance, or some other apparatus having communication components to communicate with LTE base station 110.

In operation, WCD 115 may require a data communication with data server 130 for a variety of applications, including video streaming applications, email applications, and file sharing applications, amongst a variety of other applications. To facilitate the communication, a transmission control protocol/Internet Protocol (TCP/IP) communication is configured between WCD 115 and data server 130 over LTE network elements, which include LTE gateway 120 and LTE base station 110. LTE base station 110 may provide wireless communication service to WCD 115 as well as a plurality of other WCDs within the same wireless sector.

As more devices connect to LTE base station 110, or the bandwidth required from LTE base station 110 increases, LTE base station 110 may identify that a congestion criteria is met, requiring a change in policy for connecting wireless devices. In the present example, to change the policies and rules for connecting devices, explicit congestion notification (ECN) is used. ECN allows end-to-end notification of network congestion without dropping packets that would usually be received by the end user device. Accordingly, ECN allows a device, such as LTE base station 110 to insert a flag indicating to LTE gateway 120 that the wireless access point is experiencing a swell in congestion. Responsive to the flag, LTE gateway 120 may modify the policies and rules for the connecting devices to reduce the congestion at the node. For example, any streaming communications may be turned to black and white, specific communications may be terminated based on a quality of service, devices may be throttled or bandwidth limited based on the quality of service, or a variety of other functions may be implemented to ease the congestion at LTE base station 110.

Figure 2:
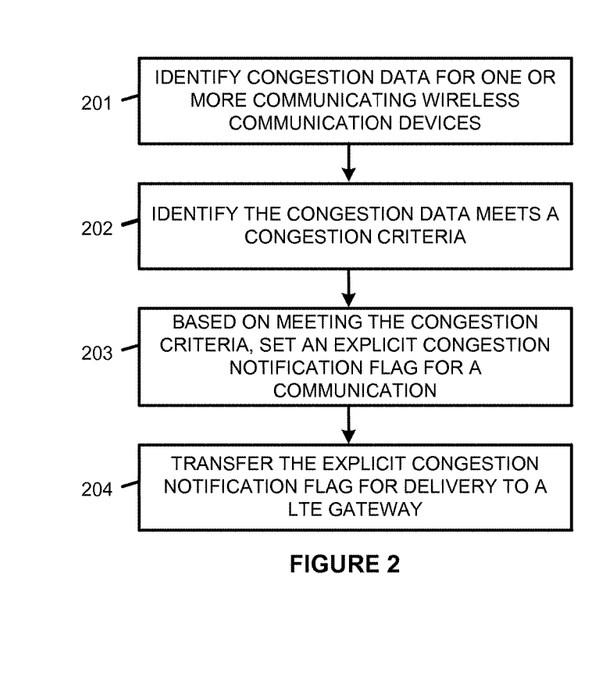
FIG. 2 illustrates a method of operating a Long Term Evolution base station to control communication policies based on congestion.

FIG. 2 illustrates a method of operating LTE base station 110 to control communication policies based on congestion. As described in FIG. 1, LTE base station 110 may provide wireless communication service to a plurality of WCDs. While providing the communication services, LTE base station 110 identifies congestion data for the one or more WCDs communicating with the base station (201). This congestion data may include the radio frequency noise data, the number of devices connected to LTE base station 110, the quantity of data being communicated over LTE base station 110, or other similar varieties of measurable congestion data. As the data is collected, LTE base station identifies whether the congestion data meets a congestion criteria (202). The congestion criteria may be based on a predefined value from an administrator, based on congestions from other LTE base stations, or any other defined congestion criteria.

Once the congestion criteria have been met within LTE base station 110, LTE base station 110 sets an ECN flag for a particular communication (203). For example, WCD 115 communicates with server 130 to send and receive data over LTE base station 110 and LTE gateway 120. As LTE base station 110 becomes more congested, base station 110 may set an ECN flag for a communication directed from WCD 115 to server 130. In some instances, ECN may be enabled between WCD 115 and server 130. Accordingly, when a congestion issue occurs, base station 110 may set a virtualized ECN flag that does not interfere with the ECN communication between WCD 115 and server 130, but is rather used exclusively between LTE base station 110 and LTE gateway 120. In other instances, LTE base station 110 may use an ECN flag between WCD 115 and server 130 when the ECN flag is not in use. Once the ECN flag is set, the flag is transferred for delivery to an LTE gateway (204) to determine the appropriate network configuration changes.

Figure 3:
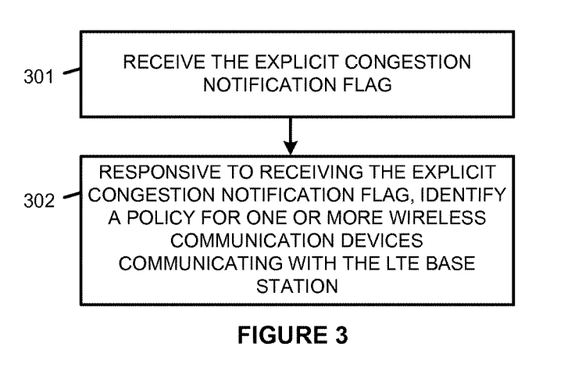
FIG. 3 illustrates a method of operating a Long Term Evolution gateway to control communication policies based on congestion.

FIG. 3 illustrates a method of operating LTE gateway 130 to control communication policies based on congestion. As described in FIG. 2, an LTE base station may identify congestion based on a variety of factors including RF noise, the amount of devices attempting to communicate using the base station, the amount of outgoing or incoming data through the base station, amongst a variety of other congestion factors. Once a congestion criteria is met based on the factors, the base station sets and transfers an ECN flag to LTE gateway 130. LTE gateway 130 receives the ECN flag (301) and, responsively, identifies a policy for one or more WCDs communicating with the LTE base station (302).

For example, a plurality of WCDs may be communicating using LTE base station 110. As the congestion from the devices increases, a congestion criteria may be met that requires a reduction in the amount of data that is communicated over LTE base station 110. Once the criteria is met, LTE base station 110 may set a ECN flag for one of the communications, such as the communication for WCD 115, and transfer the ECN flag for delivery to LTE gateway 120. Once the ECN flag is received by LTE gateway 120, LTE gateway 120 identifies new policies to reduce the amount of congestion over LTE base station 110. This policy identification may include stopping or bandwidth restricting particular devices that have a lower quality of service, stopping or bandwidth restricting particular applications, or any other possible policy modification to reduce the congestion on LTE base station 110.

In some instances, LTE gateway 120 may communicate with a Policy and Charging Rules Function (PCRF). The PCRF is a software node designated in real-time to determine policy rules in a multimedia network, such as quality of service and charging rules. Accordingly, LTE gateway 120 may, when an ECN flag is received, transfer a request to the PCRF to determine any policy changes that should be implemented for connecting devices to the LTE base station.

Figure 4:
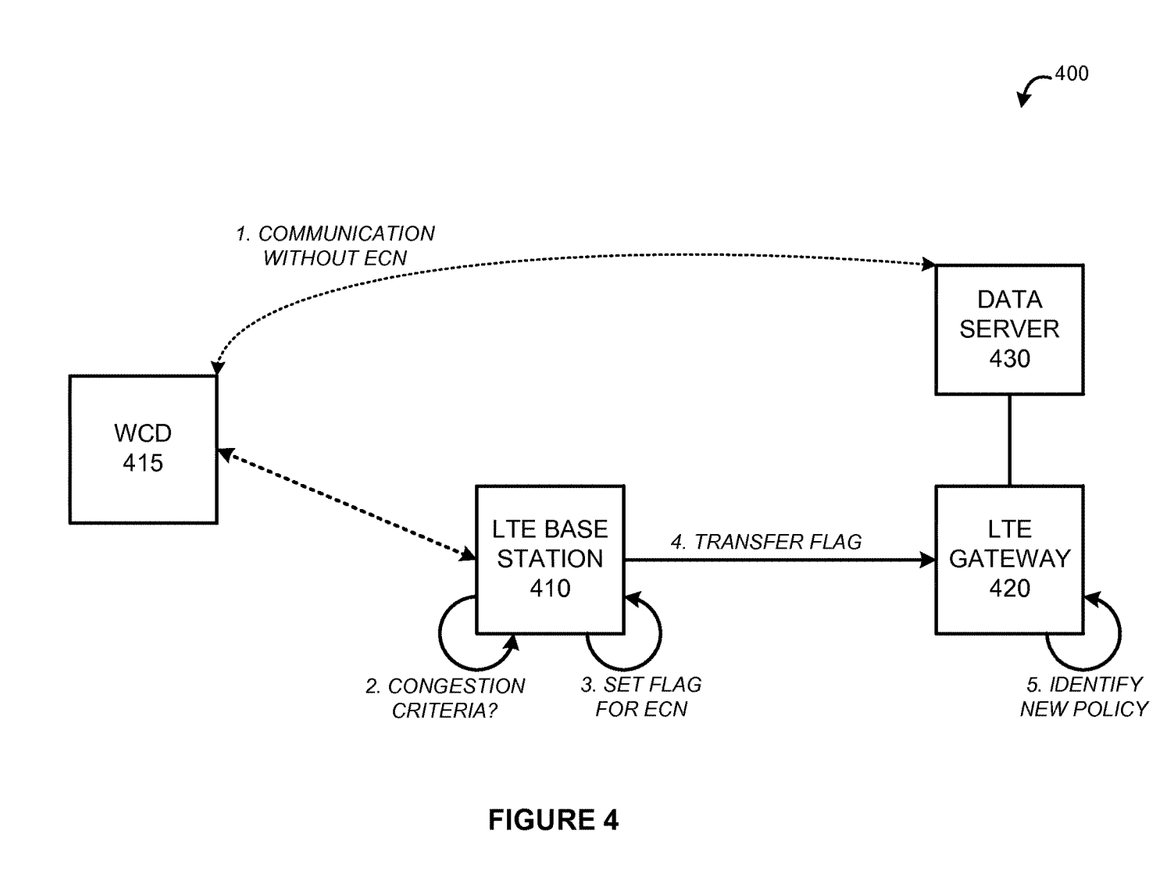
FIG. 4 illustrates an overview of operating a communication system to control communication policies based on congestion.

FIG. 4 illustrates an overview 400 of operating a communication system to control communication policies based on congestion. Overview 400 includes LTE base station 410, which may comprise an eNodeB in some examples, WCD 415, LTE gateway 420, and data server 430. As depicted, the communication between WCD 415 and data server 430 does not use ECN to determine the amount of congestion along a particular path. ECN is typically used between two end point connections to determine if there is a congestion issue along the path, but the use of ECN must be approved by both devices. Accordingly, because both devices are not using ECN in the present example, congestion is not typically identified between WCD 415 and data server 430.

Here, as the amount of congestion increases for LTE base station 410, LTE base station 410 may identify that the congestion has surpassed a threshold, or met a congestion criteria based on collected congestion data. As a result of meeting the congestion criteria, LTE base station 410 uses the ECN for a particular communication to notify LTE gateway 420 of the congestion. In the present example, LTE base station 410 identifies the communication between WCD 415 and data server 430 to set the ECN flag. As a result, because the communication does not use the ECN flag, LTE base station 410 may temporarily use the flag with LTE gateway 420. Once the flag is set, it is transferred to LTE gateway 420 to identify a new policy for the connecting devices to better handle the congestion. In some examples, devices may be allocated separate policies based on whether there is congestion at the base stations or not. Accordingly, a device may be allocated a first policy with a higher bandwidth when there is low congestion, but may be provided with a second policy with a lower bandwidth when there is high congestion.

Figure 5:
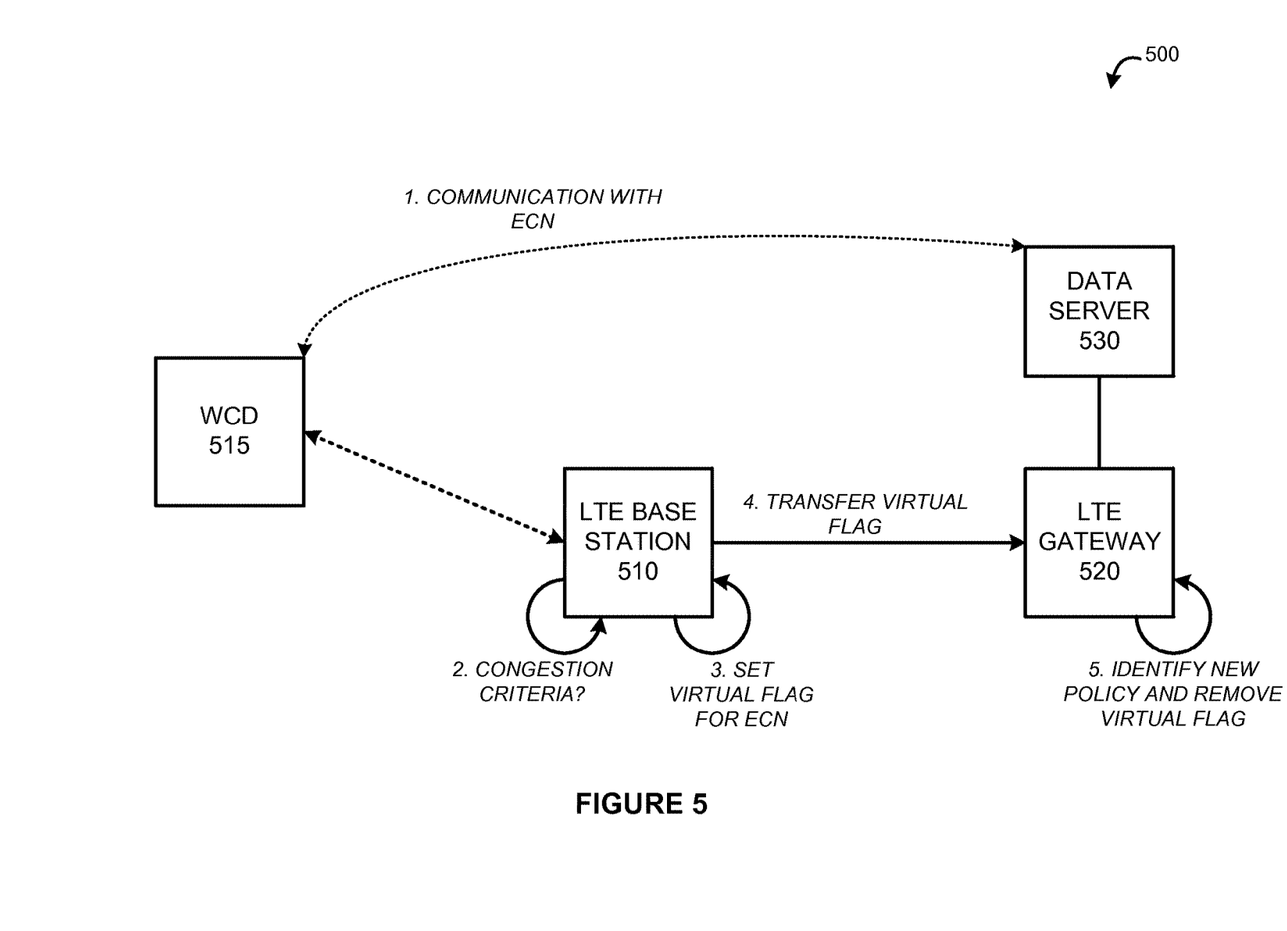
FIG. 5 illustrates an overview of operating a communication system to control communication policies based on congestion.

FIG. 5 illustrates an overview 500 of operating a communication system to control communication policies based on congestion. Overview 500 includes LTE base station 510, which may comprise an eNodeB in some examples, WCD 515, LTE gateway 520, and data server 530.

Similar to the operation described in overview 400, WCD 515 communicates with data server 530 over LTE base station 510 and LTE gateway 520. In the present example, the communication uses ECN to notify data server 530 of any congestion in the path between data server 530 and WCD 515. Accordingly, when LTE base station 510 identifies that a congestion criteria is met by the devices communicating over LTE base station 510, LTE base station 510 sets a virtual ECN flag within the communication between WCD 515 and data server 530. By implementing the virtual flag, LTE base station 510 preserves the original congestion notification between the two endpoints, but provides the virtual flag to dictate the congestion to LTE gateway 520. Once the virtual flag is received by LTE gateway 520, LTE gateway 520 identifies new policies for one or more of the communication devices communicating over LTE base station 510. These new policies may include stopping or bandwidth restricting particular devices that have a lower quality of service, stopping or bandwidth restricting particular applications, or any other possible policy modification to reduce the congestion on LTE base station 510.

Although not illustrated in the present example, once the virtual flag is received by LTE gateway 520, the flag may be removed before the communication from WCD 515 is transferred on to data server 530. Thus, when WCD transfers a TCP/IP communication to data server 530, LTE base station 510 and LTE gateway 520 use the virtual ECN flag to communicate congestion information without effecting the communication at the WCD or the data server. Further, although illustrated in present example using a virtual ECN flag, it should be understood that LTE base station 510 may temporarily make a modification to the ECN flag to notify LTE gateway 520 of the congestion at the base station. Once the notification is received, LTE gateway 520 may return the ECN flag to the state originally provide by WCD 515.

Figure 6:
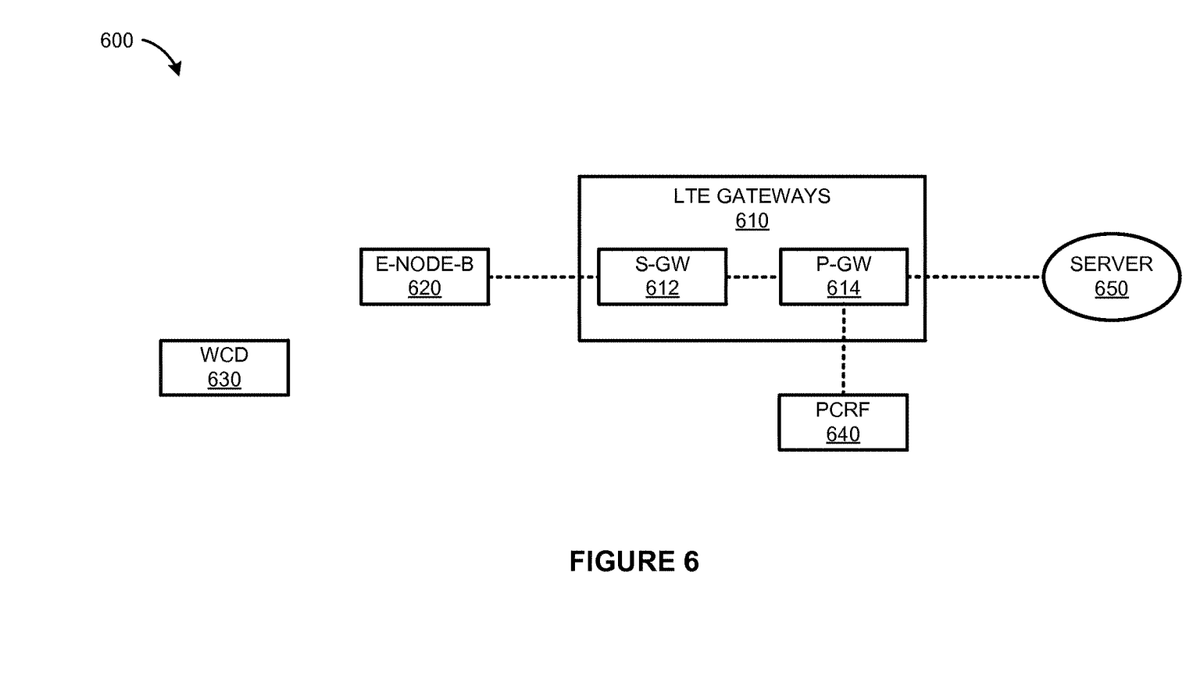
FIG. 6 illustrates a communication system to control Long Term Evolution communication policies based on congestion.

FIG. 6 illustrates a communication system 600 to control LTE communication policies based on congestion. Communication system 600 includes LTE gateways 610, eNodeB 620, WCD 630, PCRF 640, and server 650. LTE gateways 610 include serving gateway (S-GW) 612 and packet data network gateway (P-GW) 614, although other gateways may be used in the LTE network.

In operation, WCD 630 joins the LTE network using eNodeB 620 and, in some examples, a mobile management entity. Once joined, WCD 630 communicates with server 650 over eNodeB 620, S-GW 612, and P-GW 614. In some examples, P-GW 614 may manage the flow of data from server 650 to WCD 630. To accomplish this task, P-GW 614 communicates with PCRF 640 to identify policy and charging rules for the connecting devices. These rules may include quality of service rules that are based on payment habits of the customer, the type of application making the communication, the service level for the device, or any other similar quality of service policies for connecting wireless devices.

Figure 7:
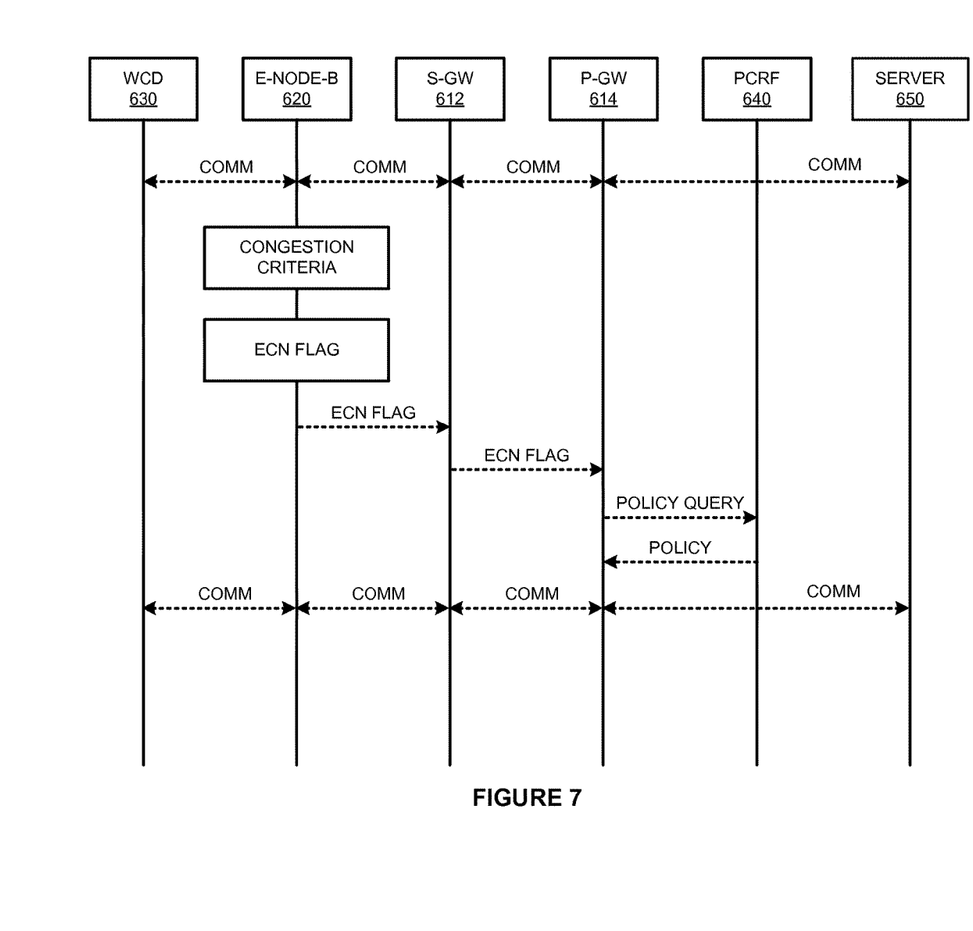
FIG. 7 illustrates a timing diagram to control Long Term Evolution communication policies based on congestion.

FIG. 7 illustrates a timing diagram to control LTE communication policies based on congestion. As depicted in FIG. 7, WCD 630 has initiated a communication with server 650 over eNodeB 620, S-GW 612, and P-GW 614. During this communication eNodeB 620 gathers congestion information, such as the number of devices communicating with eNodeB 620, the amount of data that is communicated over eNodeB 620, the signal to noise ratio at eNodeB 620, or any other similar congestion information. Based on the collected information, eNodeB 620 identifies that a congestion criteria is met, which may be predefined by an administrator, based on the congestion at other eNodeBs, or any other predefined factor.

Once the congestion criteria are met, eNodeB 620 sets an ECN flag in the communication between WCD 630 and server 650, and transfers the ECN flag to P-GW 614 over S-GW 612. Once the ECN flag is received, P-GW 614 initiates a policy query to PCRF 640 to identify a new policy to accommodate the congestion at eNodeB 620. In some examples, PCRF 640 may contain multiple policies for devices based on their quality of service and the amount of congestion at the eNodeBs. Thus, a communication may have a first quality of service when the eNodeB is not congested, then may have a second quality of service when the eNodeB is congested, which may slow or terminate the communication. Once the policy is determined by PCRF 640, PCRF 640 returns a policy to be implemented by P-GW 614. P-GW 614 implements the new policy and continues the communication between WCD 630 and server 650 based on the new policy.

Figure 8:
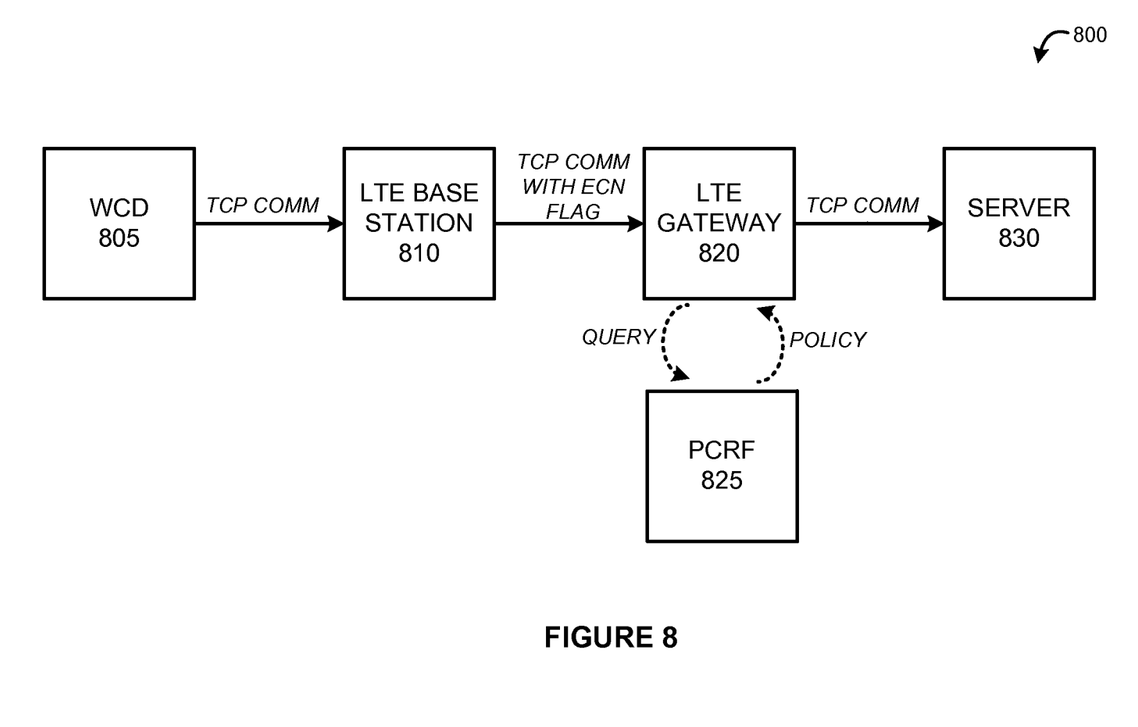
FIG. 8 illustrates a flow diagram for transferring an ECN flag to indicate Long Term Evolution congestion.

FIG. 8 illustrates a flow diagram for transferring an ECN flag to indicate LTE congestion. FIG. 8 includes WCD 805, LTE base station 810, LTE gateway 820, PCRF 825 and server 830. As depicted, WCD transfers TCP communications to LTE base station 810. These TCP communications are used to detect issues, such as IP packet loss, duplication, or delivered out of order. Once the TCP communication received, LTE base station 810 may set an ECN flag that is contained within the TCP communication to indicate when LTE base station 810 is congested. If LTE base station 810 is congested and sets the flag, the communication is transferred for delivery to LTE gateway 820. Once received, LTE gateway identifies that the ECN flag has been set and queries PCRF 825 to gather new policy information for one or more WCDs connected to LTE base station 810. This new policy information may be used to bandwidth restrict one or more of the devices, terminate device connections with the base station, or any other action based on the congestion of LTE base station 810. In some examples, the policies may be determined based on a quality of service for the device or the application. For example, a user may pay a greater amount for a higher quality of service. Accordingly, when LTE base station 810 becomes congested, the user may expect a higher bandwidth than a user that pays a lower amount. Similarly, a user of a voice application may expect a higher quality of service than a user of a video streaming application. As a result, the user of the movie streaming application may experience a bandwidth restriction that reduces the quality of service more than the user of the voice application.

In addition to determining the policy information for the connected wireless devices, LTE gateway 820 may, in some examples, remove the ECN flag set by LTE base station 810 before the TCP communication is sent to server 830. Thus, LTE base station 810 and LTE gateway 820 may temporarily use the ECN flag without disturbing the communication between the wireless device and the server.

Figure 9:
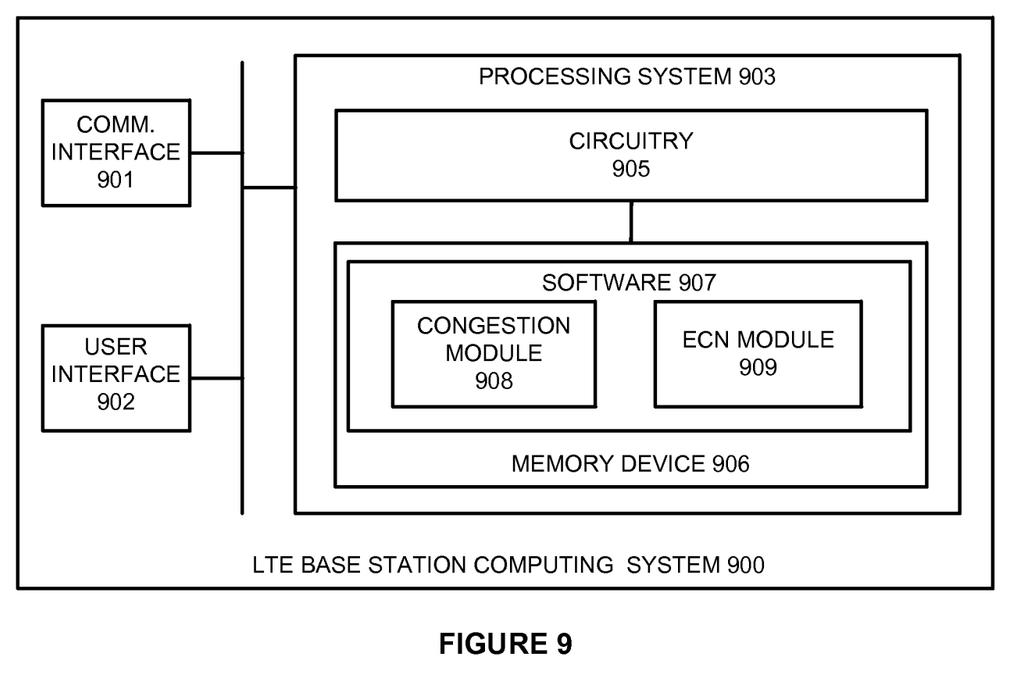
FIG. 9 illustrates a Long Term Evolution base station computing system to control Long Term Evolution communication policies based on congestion.

FIG. 9 illustrates a LTE base station computing system 900 to control LTE communication policies based on congestion. Base station computing system 900 is representative of a computing system that may be employed in any computing apparatus, system, or device, or collections thereof, to suitably implement the LTE base stations and eNodeBs described herein. Computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, such as LTE, communication signaling, or some other communication format—including combinations thereof. Communication interface 901 may be configured to communicate with one or more WCDs using LTE communication format. Communication interface 901 may further be configured to communicate with an LTE gateway that provides access to packet data networks, such as the internet, to the WCDs.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes congestion module 908 and ECN module 909. Operating software 907 may further include an operating system, utilities, drivers, network interfaces, applications, or some other type of software. When executed by circuitry 905, operating software 907 directs processing system 903 to operate LTE base station computing system 900 as described herein.

In particular, communication interface 901 communicates with one or more WCDs to provide the devices with various data services. As more devices connect or more data is required for the connecting devices, congestion module 908 detects that a congestion criteria is met, which may be based on RF noise, the number of users connected to the LTE base station, the amount of data communicated using the LTE base station, or any other measurable congestion value. Once the congestion criteria is met, ECN module 909 sets a flag within a communication for a wireless device to notify the LTE base station of the congestion.

For example, a wireless device may communicate across a LTE network with a data server to receive various types of data. During this communication, the device transmits TCP responses to the data server to verify that all of the data packets are being received. Additionally, in the present example, computing system 900 may use the TCP communications and the ECN flags from at least one of the communicating wireless devices to notify the LTE gateway of congestion on the base station. Once the ECN flag is set in the devices communication, it is then delivered to the gateway to determine modified policies to account for the traffic at the base station.

Figure 10:
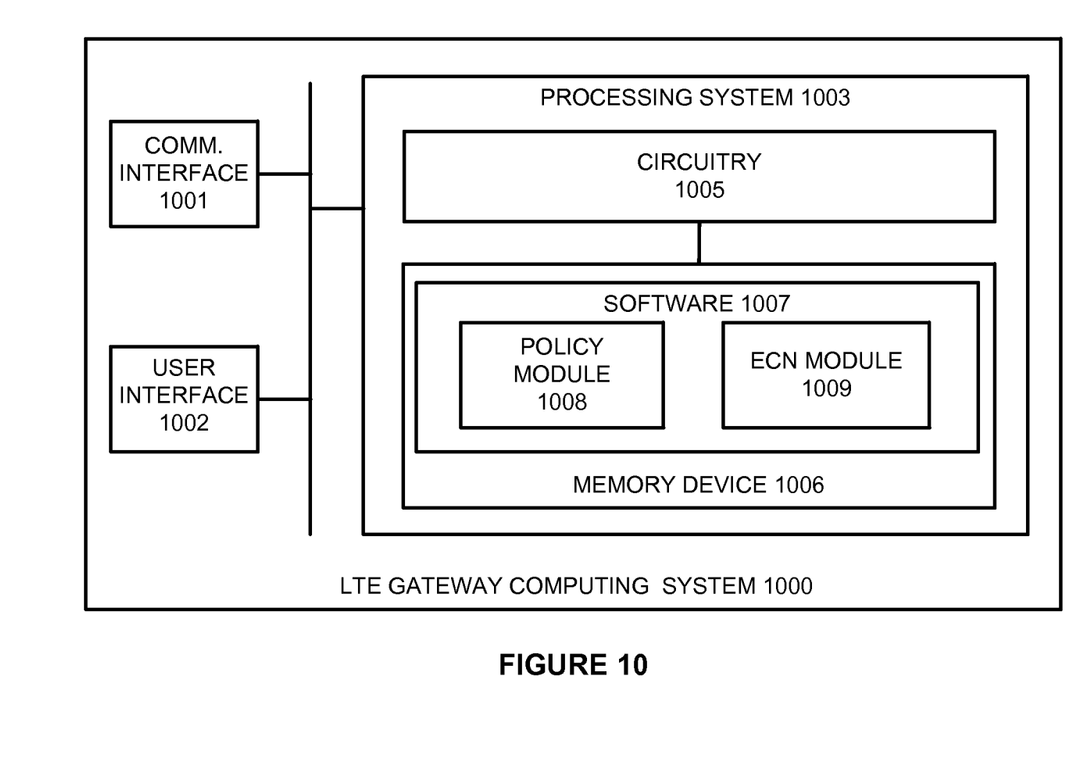
FIG. 10 illustrates a Long Term Evolution gateway computing to control Long Term Evolution communication policies based on congestion.

FIG. 10 illustrates a LTE gateway computing system 1000 to control LTE communication policies based on congestion. LTE gateway computing system 1000 is representative of a computing system that may be employed in any computing apparatus, system, or device, or collections thereof, to suitably implement the LTE gateways, P-GWs, and S-GWs described herein. Computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. Communication interface 1001 may be configured to communicate with one or more LTE base stations, and may further be configured to link the LTE network to external packet data networks, such as the internet.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes policy module 1008 and ECN module 1009. Operating software 1007 may further include an operating system, utilities, drivers, network interfaces, applications, or some other type of software. When executed by circuitry 1005, operating software 1007 directs processing system 1003 to operate LTE base station computing system 1000 as described herein.

In particular, communication interface 1001 receives ECN flags in communications from an LTE base station. Responsive to receiving the ECN flags, policy module 1008 is configured to identify policies and rules for the connecting devices based on the congestion at the LTE base station. In some examples, the policy and rules may be determined within the LTE gateway itself. In other instances, LTE gateway computing system 1000 may communicate with a PCRF, or other similar policy function to determine the rules for the connecting devices. Once the policy is determined, computing system 1000 enforces the rules to limit the congestion across the LTE base station.

As illustrated in the present example, LTE gateway computing system 1000 further includes ECN module 1009 that is configured to manage the ECN flags once they are received and may return the ECN flags to the original state before providing the ECN signal to the origin data server for the content. For instance, an LTE base station may insert an ECN flag, but LTE gateway computing system 1000 may remove the flag prior to forwarding the communication to the data server.

Although illustrated in the present example with two software modules, it should be understood that LTE base station computing system 900 and LTE gateway computing system 1000 may include any number of software modules.

Returning to the elements of FIG. 1, LTE base station 110 includes RF communication circuitry and an antenna. The RF communication circuitry typically includes an amplifier, filter, RF modulator, and signal processing circuitry. LTE base station 110 may also each comprise a router, server, memory device, software, processing circuitry, cabling, power supply, network communication interface, structural support, or some other communication apparatus. In some examples, LTE base station 110 may comprise an eNodeB capable of providing LTE communication format to a plurality wireless devices, such as WCD 110.

WCD 115 may comprise a telephone, computer, e-book, mobile Internet appliance, wireless network interface card, media player, game console, or some other wireless communication apparatus. WCD 115 includes communication interfaces, network interfaces, processing systems, computer systems, microprocessors, storage systems, storage media, or some other processing devices or software systems.

LTE gateway 120 and server 130 may each include communication interfaces, network interfaces, processing systems, computer systems, microprocessors, storage systems, storage media, or some other processing devices or software systems, and can be distributed among multiple devices.

Communication links 140-141 each use metal, glass, optical, air, space, or some other material as the transport media. Communication link 140 uses border gateway protocol to communicate information about the status of the LTE network from IP router 110 to LTE gateway 120.

Communication link 141 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication link 140-141 may each be a direct link, or can include intermediate networks, systems, or devices, and can include a logical network link transported over multiple physical links. Wireless sector 142 includes wireless links that use the air or space as the transport media. The wireless links provide LTE communication format to various connecting WCDs, such as WCD 115.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) network to control communication policies, the method comprising:
    in an LTE base station, identifying congestion data indicative of congestion at the LTE base station caused by a plurality of wireless communication devices communicating with the LTE base station;
    in the LTE base station, identifying that the congestion data meets congestion criteria;
    in the LTE base station and responsive to the congestion data meeting the congestion criteria, setting a virtual explicit congestion notification (ECN) flag for a wireless communication device communication that already has an ECN flag set for the wireless communication device communication;
    in the LTE base station, transferring the virtual ECN flag for delivery to an LTE gateway;
    in the LTE gateway, receiving the virtual ECN flag; and
    in the LTE gateway and responsive to receiving the virtual ECN flag, identifying a congestion policy for at least one wireless communication device in the plurality of wireless communication devices communicating with the LTE base station based on a quality of service associated with each of the wireless communication devices.

2. The method of claim 1 wherein the LTE gateway comprises a packet data network gateway.

3. The method of claim 1 wherein the congestion data comprises radio frequency noise data caused by the plurality of wireless communication devices communicating with the LTE base station.

4. The method of claim 1 wherein the congestion data comprises a quantity of wireless communication devices communicating with the LTE base station.

5. The method of claim 1 wherein the congestion data comprises a quantity of data communicated over the LTE base station by the plurality of wireless communication devices.

6. The method of claim 1 wherein the congestion policy for the at least one wireless communication device communicating with the LTE base station comprises a bandwidth limiting policy for the at least one wireless communication device communicating with the LTE base station.

7. The method of claim 1 wherein identifying the congestion policy for the at least one wireless communication device communicating with the LTE base station comprises:
    transferring a policy and rule request for delivery to policy and charging rules function; and
    receiving policy rules for the at least one wireless communication device communicating with the LTE base station.

8. The method of claim 1 further comprising:
    in the LTE gateway, removing the virtual ECN flag for the wireless communication device communication.

9. The method of claim 1 wherein the LTE base station comprises an eNodeB.

10. A communication system to manage communication policies based on congestion, the communication system comprising:
    an LTE base station configured to:
        identify congestion data indicative of congestion at the LTE base station caused by a plurality of wireless communication devices communicating with the LTE base station;
        identify that the congestion data meets congestion criteria;
        in response to the congestion data meeting the congestion criteria, set a virtual explicit congestion notification (ECN) flag for a wireless communication device communication that already has an ECN flag set for the wireless communication device communication; and
        transfer the virtual ECN flag for delivery to an LTE gateway; and
    the LTE gateway configured to:
        receive the virtual ECN flag; and
        in response to receiving the virtual ECN flag, identify a congestion policy for at least one wireless communication device in the plurality of wireless communication devices communicating with the LTE base station based on a quality of service associated with each of the wireless communication devices.

11. The communication system of claim 10 wherein the LTE gateway comprises a packet data network gateway.

12. The communication system of claim 10 wherein the congestion data comprises radio frequency noise data caused by the plurality of wireless communication devices communicating with the LTE base station.

13. The communication system of claim 10 wherein the congestion data comprises a quantity of wireless communication devices communicating with the LTE base station.

14. The communication system of claim 10 wherein the congestion data comprises a quantity of data communicated over the LTE base station by the plurality of wireless communication devices.

15. The communication system of claim 10 the congestion policy for the at least one wireless communication device communicating with the LTE base station comprises a bandwidth limiting policy for the at least one wireless communication device communicating with the LTE base station.

16. The communication system of claim 10 wherein the LTE gateway configured to identify the congestion policy for the at least one wireless communication device communicating with the LTE base station is configured to:
    transfer a policy and rule request for delivery to policy and charging rules function; and
    receive policy rules for the at least one wireless communication device communicating with the LTE base station.

17. The communication system of claim 10 wherein the LTE gateway is further configured to remove the virtual ECN flag for the wireless communication device communication.

18. The communication system of claim 10 wherein the LTE base station comprises an eNodeB.

19. The method of claim 1 wherein the quality of service associated with each of the wireless communication devices comprises a quality of service associated with an application executing on each of the wireless communication devices.

20. The communication system of claim 10 wherein the quality of service associated with each of the wireless communication devices comprises a quality of service associated with an application executing on each of the wireless communication devices.

\* \* \* \* \*